United States Patent
Thiriet et al.

(10) Patent No.: US 12,030,662 B2
(45) Date of Patent: Jul. 9, 2024

(54) PROPULSION SYSTEM FOR A HELICOPTER

(71) Applicant: SAFRAN HELICOPTER ENGINES, Bordes (FR)

(72) Inventors: Romain Jean Gilbert Thiriet, Moissy-Cramayel (FR); Olivier Bedrine, Moissy-Cramayel (FR); Antoine Pascal Moutaux, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 276 days.

(21) Appl. No.: 17/769,939

(22) PCT Filed: Oct. 15, 2020

(86) PCT No.: PCT/FR2020/051843
§ 371 (c)(1),
(2) Date: Apr. 18, 2022

(87) PCT Pub. No.: WO2021/074537
PCT Pub. Date: Apr. 22, 2021

(65) Prior Publication Data
US 2022/0388673 A1    Dec. 8, 2022

(30) Foreign Application Priority Data

Oct. 17, 2019   (FR) ........................................ 1911599

(51) Int. Cl.
*B64D 35/08* (2006.01)
*B64C 27/12* (2006.01)
(Continued)

(52) U.S. Cl.
CPC .............. *B64D 35/08* (2013.01); *B64C 27/12* (2013.01); *B64D 27/24* (2013.01); *B64D 27/026* (2024.01)

(58) Field of Classification Search
CPC .. B64D 35/08; B64D 27/24; B64D 2027/026; B64C 27/12; Y02T 50/60
See application file for complete search history.

(56) References Cited

U.S. PATENT DOCUMENTS

2014/0346283 A1* 11/2014 Salyer .................... B64C 27/24
903/903

FOREIGN PATENT DOCUMENTS

FR   2 933 910 A1   1/2010
FR   2 962 404 A1   1/2012
(Continued)

OTHER PUBLICATIONS

International Patent Application No. PCT/FR2020/051843, International Search Report and Written Opinion dated Jan. 28, 2021, 7 pgs.
(Continued)

*Primary Examiner* — Valentina Xavier
(74) *Attorney, Agent, or Firm* — Cozen O'Connor

(57) ABSTRACT

A propulsion system (1) for a helicopter, comprising a turboshaft engine (2) with a linked turbine and an electric machine (3) capable of operating as an electric motor, the turboshaft engine (2) and the electric machine (3) being capable of driving in rotation at least one main rotor (5) intended to be coupled to a rotating wing (6) characterised in that it comprises means of coupling and decoupling (14) in rotation between a rotor (3a) of the electric machine (3) and a rotor (2a) of the turboshaft engine (2), the means of coupling and decoupling (14) being capable of allowing the rotor (2a) of the turboshaft engine (2) to be driven in rotation (Continued)

with the aid of the electric machine (3), in a first state of the propulsion system (1), and capable of allowing the rotor (2*a*) of the turboshaft engine (2) and the rotor (3*a*) of the electric machine (3) to be decoupled in rotation, in a second state of the propulsion system (1).

16 Claims, 2 Drawing Sheets

(51) Int. Cl.
*B64D 27/24* (2006.01)
*B64D 27/02* (2006.01)

(56) References Cited

FOREIGN PATENT DOCUMENTS

FR 3 027 346 A1 4/2016
FR 3 078 057 A1 8/2019

OTHER PUBLICATIONS

French Patent Application No. 1911599; Search Report dated Jul. 15, 2020; 8 pgs.

\* cited by examiner

PROPULSION SYSTEM FOR A HELICOPTER

CROSS-REFERENCE TO RELATED APPLICATIONS

This application is a 35 U.S.C. § 371 filing of International Application No. PCT/FR2020/051843 filed Oct. 15, 2020, which claims the benefit of priority to French Patent Application No. 1911599 filed Oct. 17, 2019, which is incorporated herein by reference in its entirety.

TECHNICAL FIELD OF THE INVENTION

The present invention relates to a propulsion system for a helicopter.

PRIOR ART

A helicopter is usually equipped with a main rotor driving a rotating wing to ensure its lift and propulsion. It is also known how to equip a helicopter with a tail rotor, also called anti-torque rotor (ATR), to counteract the torque exerted by the main rotor on the helicopter fuselage.

In order to rotate the main rotor and, if necessary, the anti-torque rotor, the helicopter is equipped with a propulsion system comprising a turboshaft engine. The turboshaft engine can comprise a so-called free turbine or a so-called linked turbine.

In the case of a free-turbine engine, a first turbine, known as the high-pressure turbine, drives the engine's compressor, while a second turbine, known as the low-pressure turbine, is connected to a gearbox, also known as the Main Gearbox or MGB. The latter allows the speed to be reduced before transmitting the torque to the helicopters main rotor. Free-turbine engines are known as "double-shaft" engines.

In the case of a linked turbine engine, all compressor or turbine stages are attached to a single shaft. These motors are known as "single shaft" motors. The entire engine assembly is directly connected by this single shaft to the main gearbox.

A free turbine engine, although having a more complex structure, allows it to operate close to optimum efficiency over a wide range of operating speeds.

In contrast, a turboshaft engine with a linked turbine has a less complex structure but only one optimal operating point. Operating the engine at speeds other than this optimum operating point causes a significant drop in efficiency.

Because of these various constraints, the turboshaft engines currently in use are free turbine engines. As specified above, such turboshaft engines have a complex architecture, requiring a greater number of parts and a higher mass and cost of manufacture and maintenance.

It is also known how to use hybrid propulsion systems, comprising a turboshaft engine and a main electric motor. The function of the main electric motor is to provide additional torque during certain phases of the helicopters operation, especially during take-off and landing. The turboshaft engine is also associated with an auxiliary electric motor, of lower power than the main motor, whose function is to start the turboshaft engine.

The invention aims to reduce the complexity, cost and mass of such a propulsion system.

DISCLOSURE OF THE INVENTION

To this end, the invention relates to a propulsion system for a helicopter, comprising a turboshaft engine with a linked turbine and an electric machine capable of operating as an electric motor, the turboshaft engine and the electric machine being capable of driving in rotation at least one main rotor intended to be coupled to a rotating wing, characterized in that it comprises means for coupling and decoupling in rotation between a rotor of the electric machine and a rotor of the turboshaft engine, the means of coupling and decoupling being capable of allowing the rotor of the turboshaft engine to be driven in rotation by means of the electric machine, in a first state of the propulsion system, and capable of allowing the rotor of the turboshaft engine and the rotor of the electric machine to be decoupled in rotation, in a second state of the propulsion system.

The use of a hybrid propulsion system allowing the main rotor to be driven by a turboshaft engine and/or an electric machine makes it possible to operate the turboshaft engine in such a way as to provide a maximum continuous power close to an optimum operating point of the turboshaft engine, and to operate the electric machine as an electric motor, so as to deliver additional power to the main rotor, in a transient operating phase, such as a take-off or landing phase.

The electric machine can also be sized and used to drive the main rotor in the event of a turboshaft engine failure or malfunction. The electrical machine then provides a redundancy function.

It is recalled that in a turboshaft engine with a linked turbine, all the compressor or turbine stages are attached to a single shaft, forming the output shaft of the turboshaft engine.

Furthermore, the propulsion system according to the invention makes it possible to start the turboshaft engine using the electric machine, without requiring an additional electric machine dedicated solely to the starting function, as is the case in the prior art. In addition, since the electric machine for starting has a high power level, the time required for starting can be significantly reduced.

In addition, the means of coupling and decoupling allow the rotors of the turboshaft engine and the electric machine to be decoupled in rotation, particularly in the event of a failure of the turboshaft engine or the electric machine, resulting in a resisting torque or a blockage of one of said rotors.

The electrical machine can also be capable of operating as an electrical generator. Alternatively, the functions of electric motor and electric generator can be performed by two separate components.

The rotor of the electric machine and/or the rotor of the turboshaft engine can be connected to the main rotor via a speed reducer.

The speed reducer can, in particular, be formed by the gears of a main gearbox.

The propulsion system can comprise an anti-torque rotor, the turboshaft engine and the electric machine being capable of rotating said anti-torque rotor.

The propulsion system can have two concentric rotors for lift, in which case an anti-torque rotor is no longer required.

The rotor of the electric machine and/or the rotor of the turboshaft engine can be connected to the main rotor via a speed reducer.

The turboshaft engine and/or electrical machine can be capable of driving a speed reducer, which is capable of driving means of electrical generation to provide electrical power to electrical receivers of the helicopter.

The accessories gearbox can be capable of driving an oil pump for lubricating moving parts of the propulsion system and a fuel pump for supplying fuel to the turboshaft engine.

The electrical receptors can be elements for powering the cockpit or ancillary functions of the helicopter, means for recharging a battery or means of electrical storage, means for cooling the electrical machine, for example.

The rotor of the electric machine can be connected to the main rotor via a first speed-reduction ratio, the rotor of the turboshaft engine being connected to the main rotor via a second speed-reduction ratio, the first reduction ratio being different from the second reduction ratio.

The speed-reduction ratio is the ratio between the rotational speed of the main rotor and the rotational speed of the rotor of the electric machine or of the rotor of the turbine engine.

The rotor of the electric machine can be connected to the main rotor via a first speed-reduction ratio, the rotor of the turboshaft engine being connected to the main rotor via a second speed-reduction ratio, the first reduction ratio being different from the second reduction ratio.

The axes of the rotors of the turboshaft engine and the electric machine can be coaxial or parallel.

The axis of the main rotor can be perpendicular or parallel to the axes of the rotors of the turboshaft engine and the electric machine.

The means of coupling and decoupling can be passive.

In other words, the means of coupling and decoupling do not have an actuator to ensure the changes of state between the coupling and decoupling functions, nor any associated means of control.

Said means of coupling and decoupling are thus for example not formed by a clutch with a controlled actuator.

This reduces the complexity of the propulsion system and increases its reliability.

The means of coupling and decoupling can ensure an irreversible type of decoupling, so that a coupling after decoupling is no longer possible except by the intervention of a maintenance operator for example.

The means of coupling and decoupling can comprise a first mobile member and a second mobile member capable of pivoting about an axis and capable of moving in translation with respect to each other along said axis, between a Closed position and a Open position of said members, said members comprising complementary means of end-stop capable of coupling said members in rotation in a first direction of rotation of the first member with respect to the second member, said members also comprising a cam capable of causing the translational displacement of the first member with respect to the second member, towards their Open position, counter to means of return tending to return said members in translation towards their Closed position, the means of coupling and decoupling also comprising means capable of ensuring deactivation of the means of return when the translational displacement of the first member with respect to the second member towards their Open position exceeds a threshold value.

Such a deactivation can for example be ensured by a frangible part of the means of return, a rupture of the frangible part occurring when the translational displacement exceeds said threshold value.

The cam can be formed by complementary sloping surfaces on the first member and the second member.

The means of coupling and decoupling can comprise a first freewheel allowing a first torque to pass from a first shaft to a second shaft, and a second freewheel allowing a second torque to pass from the second shaft to the first shaft, the second freewheel being associated with a frangible member which could break when the second torque exceeds a threshold value.

The first shaft can be connected to the rotor of the turboshaft engine and/or the rotor of the electric machine.

The second shaft can be connected to the main rotor and/or the anti-torque rotor.

The anti-torque rotor is driven by the main rotor.

Thus, in normal operation, torque is transmitted from the turboshaft engine or electric machine to the main rotor or anti-torque rotor through the first freewheel. In the event of a failure, the rotor of the turboshaft engine or electric machine creates a resistive torque due to a malfunction or even a blockage of the rotor, causing the torque to pass through the second freewheel. If this resistive torque is too high, then the frangible member is broken, resulting in decoupling. In yet another variation, the means of coupling and decoupling comprise only a frangible member which could break when the torque transmitted through said frangible member exceeds a threshold value.

In yet another variation, the means of coupling and decoupling comprise a claw system controlled by an actuator such that the claw system is movable between a rotational coupling position and an uncoupling position.

The turboshaft engine can provide between 50% and 60% of the total propulsive power, with the remainder provided by the electric machine.

The electric machine and the turboshaft engine can be lubricated and/or cooled by a circuit of fluid, for example oil, through a circuit common to the electric machine and the turboshaft engine. The turboshaft engine can be lubricated or cooled even if it fails.

The electric machine and/or the turboshaft engine can extend along a horizontal or vertical axis.

The invention also relates to a helicopter with a propulsion system of the above type.

DETAILED DESCRIPTION OF THE INVENTION

Figure 1:
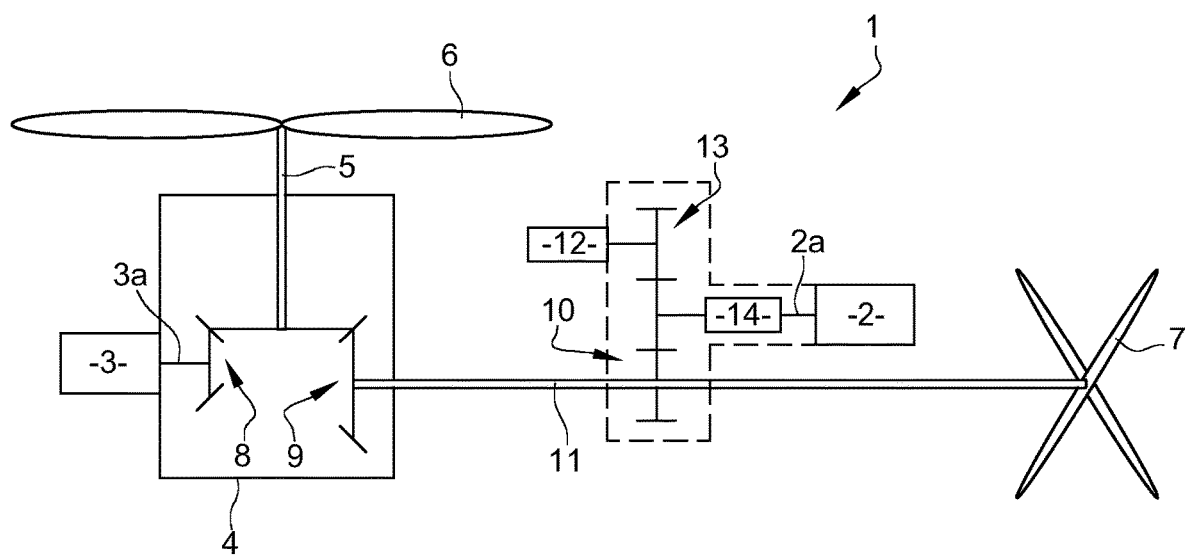
FIG. 1 is a schematic view of a propulsion system according to a first embodiment of the invention.

FIG. 1 illustrates a propulsion system 1 for a helicopter, according to a first embodiment of the invention. This comprises a turboshaft engine 2 with a linked turbine and an electric machine 3 capable of operating as an electric motor.

The turboshaft engine 2 and the electric machine 3 are capable of rotating, via a main gearbox 4, a main rotor 5, intended to be coupled to a rotary wing 6 forming a single lift rotor, and an anti-torque rotor 7 located at the end of a beam at the rear of a fuselage of the helicopter.

Naturally, the invention is not limited to such an architecture and can also be used in the case of two concentric rotors ensuring lift, the presence of an anti-torque rotor being then no longer necessary.

In particular, the rotor 3a of the electric machine 3 is connected to the main rotor 5 via a first speed reducer formed by gears 8 of the main gearbox providing a first speed ratio between the speed of rotation of the main rotor 5 and the speed of rotation of the rotor 3a of the electric machine 3. Furthermore, the rotor 2a of the turboshaft engine 2 is connected to the main rotor 5 via a second speed reducer which provides a second speed ratio between the speed of the main rotor 5 and the speed of the rotor 3a of the electric machine 3. The second speed reducer is formed by gears 9 of the main gearbox 4 and by gears 10 of a gear train of a speed reducer 13, located between the rotor of the turboshaft engine 2 and an intermediate drive shaft 11 cooperating with the main gearbox 4. The first speed ratio is different from the second speed ratio. The propulsion system 1 also allows at least one accessory 12 to be driven via the gears 10 of the speed reducer 13.

The intermediate drive shaft 11 is also used to drive the anti-torque rotor 7.

Means of coupling and decoupling 14 are interposed between the rotor of the turboshaft engine 2 and the gears 10 of the speed reducer 13. These are passive, i.e. they do not have an actuator to ensure the changes of state between the coupling and decoupling functions, nor do they have any associated means of control.

Figure 4:
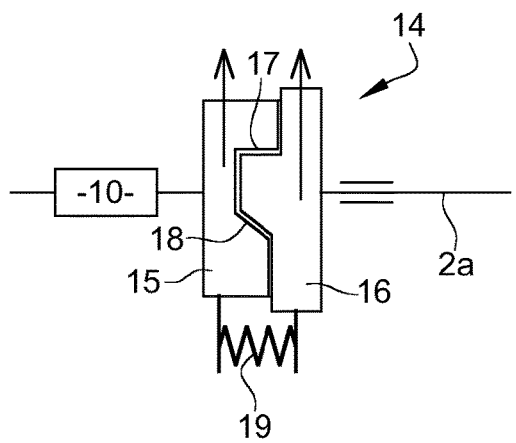
FIG. 4 is a schematic view of the means of coupling and decoupling according to a first embodiment of the invention, with the mobile members in a Closed position.
Figure 5:
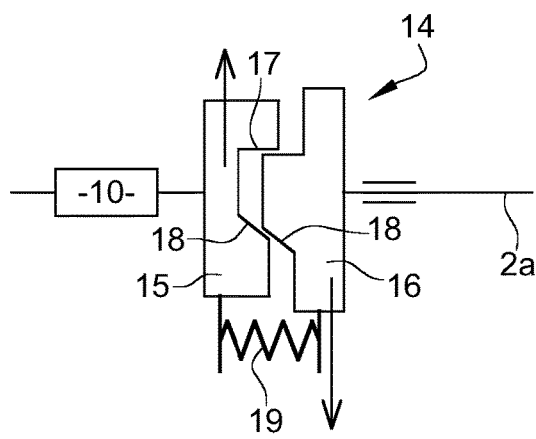
FIG. 5 is a view corresponding to FIG. 4, with the mobile members in an Open position.

As illustrated in FIGS. 4 and 5, the means of coupling and decoupling 14 comprise a first mobile member 15 connected to the gears 10 of the speed reducer 13, and a second mobile member 16 connected to the rotor 2a of the turboshaft engine 2, capable of pivoting about the axis of said rotor 2a and capable of moving in translation with respect to each other along said axis, between a Closed position (FIG. 4) and an Open position (FIG. 5) of said members 15, 16. The members 15, 16 comprising complementary means of end-stop 17 capable of coupling in rotation said members 15, 16 in a first direction of rotation of the first member with respect to the second member, said members 15, 16 also comprising complementary oblique surfaces 18 forming a cam capable of causing the translational displacement of the first member 15 with respect to the second member 16, towards their Open position, counter to means of return 19 tending to return in translation said members 15, 16 towards their Closed position.

The means of coupling and decoupling 14 also include means capable of ensuring deactivation of the means of return 19 when the translational displacement of the first member 15 with respect to the second member 16 towards their Open position exceeds a threshold value. Such a deactivation can for example be ensured by a frangible part of the means of return, a rupture of the frangible part occurring when the translational displacement exceeds said threshold value.

Thus in a normal operating case corresponding to FIG. 4, the turboshaft engine 2 can rotate the rest of the propulsion system, in particular the main rotor 5 and the anti-rotation rotor. Such an embodiment also allows the transfer of a starting torque from the electric machine 3 to the turboshaft engine 2, through members 15, 16. In such a case, the torque transmitted is not sufficient to move the first and second members 15, 16 sufficiently apart along the X axis so that the breaking point is not reached.

In the event of failure of the turboshaft engine 2, for example in the event of blockage of the rotor 2a of the turboshaft engine 2, said rotor 2a exerts a high resisting torque, higher than the aforementioned threshold value, so as to cause the deactivation of the means of return 19 and the decoupling of the members 15, 16, thus isolating the turboshaft engine 2 from the rest of the propulsion system 1.

Figure 6:
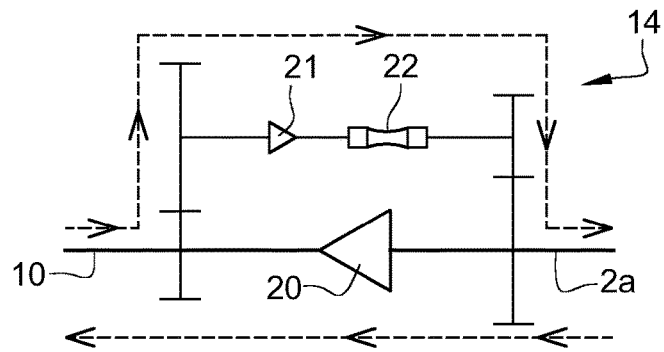
FIG. 6 is a schematic view of the means of coupling and decoupling according to a second embodiment of the invention.

FIG. 6 illustrates another embodiment of the means of coupling and decoupling, a first freewheel 20 allowing a first torque to pass from a first shaft connected to the rotor 2a of the turboshaft engine 2 to a second shaft connected to the rest of the propulsion system, in particular to the speed reducer 13, and a second freewheel 21 allowing a second torque to pass from the second shaft to the first shaft, the second freewheel 21 being associated with a frangible member 22 which could break when the second torque exceeds a threshold value. Thus, in a normal operating case, torque can be transmitted from the turboshaft engine 2 to the main rotor 5 or to the anti-torque rotor 7 through the first freewheel 20. In the event of a failure, the rotor 2a of the turboshaft engine 2 creates a resistive torque due to a malfunction or even a blockage of the rotor 2a, causing the torque to pass through the second freewheel 21. If this resistive torque is too high, then the frangible member 22 is broken, causing the turboshaft engine 2 to decouple from the rest of the propulsion system 1.

Note that the reduction ratio at the ends of the freewheel 21 is set to ensure that in nominal operation, the freewheel 21 is disconnected due to a difference in rotational speeds between the input and output.

Such an embodiment also allows the transfer of a starting torque from the electric machine 3 to the turboshaft engine 2, through members 15, 21. In such a case, the torque transmitted to ensure starting is not sufficient to break the frangible member 22.

Figure 2:
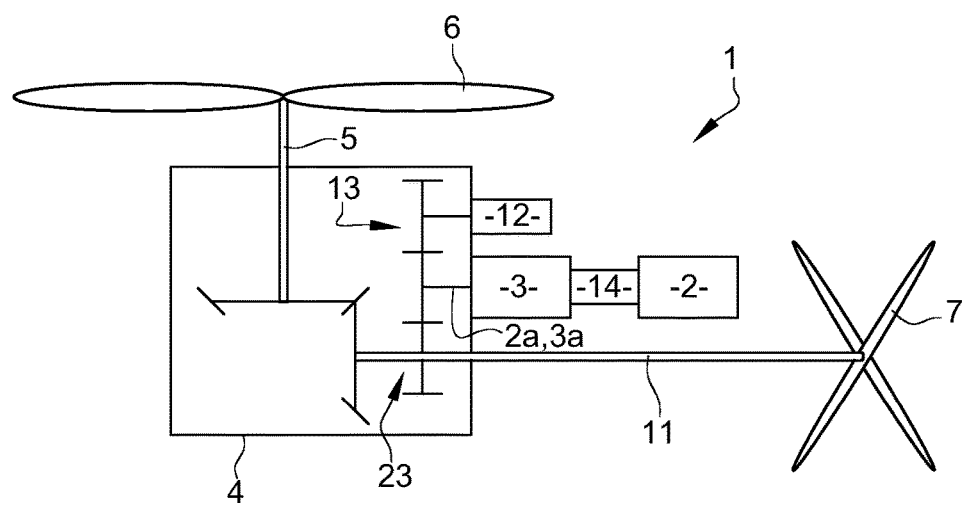
FIG. 2 is a schematic view of a propulsion system according to a second embodiment of the invention.

FIG. 2 illustrates a propulsion system 1 according to a second embodiment, which differs from the one described above in that the rotor 2a of the turboshaft engine 2 and the rotor 3a of the electric machine are either connected to the same shaft, or connected to two coaxial shafts integral in rotation with the same gear 23 of a specific gear train 13 acting as a speed reducer and arranged in a common housing with the housing of the main transmission box 4. Such an embodiment reduces the mass and size of the propulsion system 1. However, such a design requires that the rotor 2a of the turboshaft engine 2 and the rotor 3a of the electric machine 3 have essentially the same operating speed, i.e. the same rotational speed. Also in this embodiment, accessories 12 can be attached to the main gearbox housing 4 and coupled to gears of the gear train 13. Such a feature is not dependent on the form of implementation used.

Figure 3:
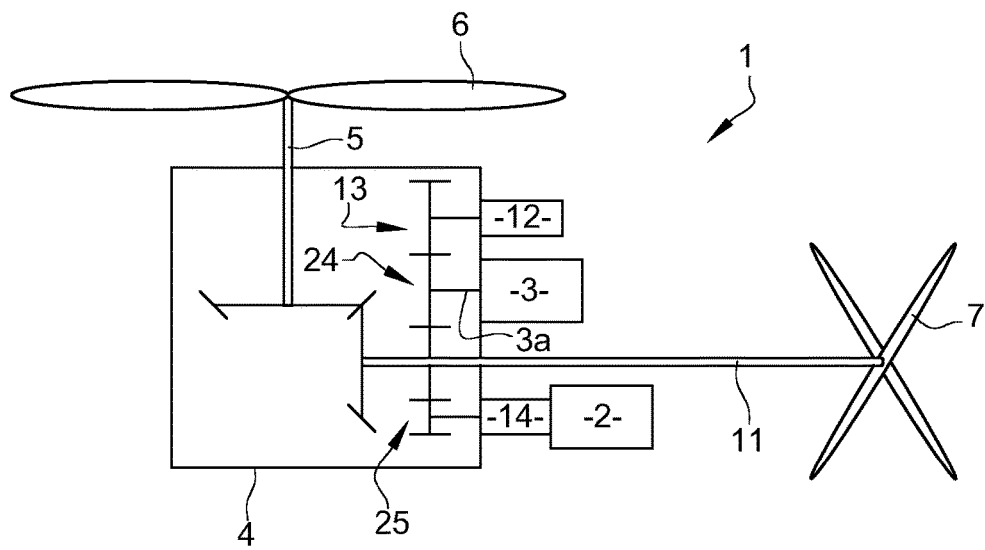
FIG. 3 is a schematic view of a propulsion system according to a second embodiment of the invention.

FIG. 3 illustrates a propulsion system according to a third embodiment, which differs from that previously shown with reference to FIG. 2 in that the rotor 3a of the electric machine 3 and the rotor 2a of the turboshaft engine 2 are parallel and offset. The rotor 3a of the electric machine 3 is connected to the drive shaft 11 via gears 24 of the specific gear train 13 acting as a speed reducer, the rotor 2a of the turboshaft engine 2 being connected to the drive shaft 11 via the means of coupling and decoupling 14 and gears 25 of the gear train 13.

The invention claimed is:

1. A propulsion system (1) for a helicopter, comprising:
   a turboshaft engine (2) with a linked turbine and a rotor (2a);
   an electric machine (3) capable of operating as an electric motor with a rotor (3a), the turboshaft engine (2) and the electric machine (3) being capable of driving in rotation at least one main rotor (5) intended to be coupled to a rotating wing (6); and means of coupling and decoupling (14) in rotation between the rotor (3a) of the electric machine (3) and the rotor (2a) of the turboshaft engine (2), the means of coupling and decoupling (14) being capable of allowing the rotor (2a) of the turboshaft engine (2) to be driven in rotation with the aid of the electric machine (3), in a first state of the propulsion system (1), and capable of allowing the rotor (2a) of the turboshaft engine (2) and the rotor (3a) of the electric machine (3) to be decoupled in rotation, in a second state of the propulsion system (1).

2. The propulsion system (1) according to claim 1, characterised in that the rotor (3a) of the electric machine (3) and/or the rotor (2a) of the turboshaft engine (2) are connected to the main rotor (5) via a speed reducer.

3. The propulsion system (1) according to claim 1, characterised in that it comprises an anti-torque rotor (7), the turboshaft engine (2) and the electric machine (3) being capable of driving said anti-torque rotor in rotation.

4. The propulsion system (1) according to claim 1, characterised in that the turboshaft engine (2) and/or the electric machine (3) are capable of driving a speed reducer (13), which is able to drive means of electrical generation for electrically supplying electric receivers of the helicopter.

5. The propulsion system (1) according to claim 1, characterized in that the rotor (3a) of the electric machine (3) is connected to the main rotor (5) via a first speed-reduction ratio, the rotor (2a) of the turboshaft engine (2) being connected to the main rotor (5) via a second speed-reduction ratio, the first reduction ratio being different from the second reduction ratio.

6. The propulsion system (1) according to claim 2, characterized in that the rotor (3a) of the electric machine (3) is connected to the main rotor (5) via a first speed-reduction ratio, the rotor (2a) of the turboshaft engine (2) being connected to the main rotor (5) via a second speed-reduction ratio, the first reduction ratio being different from the second reduction ratio.

7. The propulsion system (1) according to claim 1, characterised in that the means of coupling and decoupling (14) are passive.

8. The propulsion system (1) according to claim 1, characterised in that the means of coupling and decoupling (14) comprises:
a first mobile member (15); and
a second mobile member (16) capable of pivoting about an axis and capable of moving in translation with respect to each other along said axis, between a Closed position and an Open position of said members (15,16), said first mobile member (15) and said second mobile member (15, 16) comprising:

complementary means of end-stop (17) capable of coupling said members (15, 16) in rotation in a first direction of rotation of the first member (15) with respect to the second member (16); and
a cam (18) capable of causing the translational displacement of the first member (15) with respect to the second member (16), towards their Open position, counter to means of return (19) tending to return said members (15, 16) towards their Closed position;
the means of coupling and decoupling (14) further comprising means capable of ensuring deactivation of the means of return (19) when the translational displacement of the first member (15) with respect to the second member (16) towards their Open position exceeds a threshold value.

9. The propulsion system (1) according to claim 1, characterized in that the means of coupling and decoupling (14) comprise a first freewheel (20) allowing a first torque to pass from a first shaft to a second shaft, and a second freewheel (21) allowing a second torque to pass from the second shaft to the first shaft, the second freewheel (21) being associated with a frangible member (22) which could break when the second torque exceeds a threshold value.

10. A helicopter comprising a propulsion system (1) according to claim 1.

11. A helicopter comprising a propulsion system (1) according to claim 8.

12. A helicopter comprising a propulsion system (1) according to claim 9.

13. The propulsion system (1) according to claim 8, characterised in that the rotor (3a) of the electric machine (3) and/or the rotor (2a) of the turboshaft engine (2) are connected to the main rotor (5) via a speed reducer.

14. The propulsion system (1) according to claim 8, characterised in that it comprises an anti-torque rotor (7), the turboshaft engine (2) and the electric machine (3) being capable of driving said anti-torque rotor in rotation.

15. The propulsion system (1) according to claim 8, characterised in that the turboshaft engine (2) and/or the electric machine (3) are capable of driving a speed reducer (13), which is able to drive means of electrical generation for electrically supplying electric receivers of the helicopter.

16. The propulsion system (1) according to claim 8, characterized in that the rotor (3a) of the electric machine (3) is connected to the main rotor (5) via a first speed-reduction ratio, the rotor (2a) of the turboshaft engine (2) being connected to the main rotor (5) via a second speed-reduction ratio, the first reduction ratio being different from the second reduction ratio.

* * * * *